United States Patent Office 3,647,741
Patented Mar. 7, 1972

3,647,741
STABILIZED HEAT CURABLE SILICONE
ELASTOMERS
William Earl Hutchinson, Erie, Pa., assignor to
Stauffer-Wacker Silicone Corporation
No Drawing. Filed Dec. 18, 1968, Ser. No. 784,902
Int. Cl. C08g 51/04
U.S. Cl. 260—37                              7 Claims

ABSTRACT OF THE DISCLOSURE

Silicone elastomers having improved heat stability, compression set and resistance to reversion may be obtained by incorporating fumed titanium dioxide in heat curable organopolysiloxane compositions.

---

The present invention relates to heat curable silicone elastomers, particularly heat curable silicone elastomers having improved heat stability. More particularly, it relates to heat curable silicone elastomers which have improved compression set and improved resistance to reversion.

Silicone elastomers are generally stable at temperatures below about 150° C. and may be used at temperatures up to about 260° C. and even up to 315° C. for short periods of time. When these same silicone elastomers are used at temperatures above about 200° C. for extended periods of time, they have a tendency to deteriorate rapidly. Since silicone elastomers are generally used at elevated temperatures in many of their applications, deterioration is a highly undesirable property.

Therefore, it is an object of this invention to provide heat curable silicone elastomers having improved physical properties. Another object of this invention is to provide heat curable silicone elastomers having improved heat stability. Sill another object of this invention is to provide heat curable silicone elastomers having improved compression set. A further object of this invention is to provide silicone elastomers having improved resistance to embrittlement when heat aged. A still further object of this invention is to provide a method for improving the heat stability of heat curable silicone elastomers. Yet a still further object of this invention is to improve the resistance of silicone elastomers to enclosed reversion.

The foregoing objects and others which will become apparent from the following description are accomplished in accordance with this invention, generally speaking, by incorporating fumed titanium dioxide in heat curable organopolysiloxane compositions. The compositions when vulcanized at elevated temperatures will exhibit improved heat stability, improved compression set, and improved resistance to enclosed reversion. The addition of the fumed titanium dioxide is of special value in connection with silicone elastomers which are heat aged and are thus subject to degradation and reversion during heat aging.

The silicone elastomers of this invention are prepared in the conventional manner, namely by curing at elevated temperatures heat curable organopolysiloxanes containing fumed titanium dioxide, vulcanizing agents, fillers, if desired, additional reinforcing and non-reinforcing fillers. The compositions when properly cured, will provide silicone elastomers having improved heat resistance and improved compression set. While the presence of fumed titanium dioxide in these compositions will improve the physical properties of the silicone elastomers, its effectiveness is not contingent upon the type of organopolysiloxane or vulcanizing agent employed. The organopolysiloxanes useful in the invention are commonly referred to as dialkyl or alkylaryl polysiloxane gums. These organopolysiloxanes are well known in the art and methods for producing such materials are old and widely described in the literature. The curable organopolysiloxanes have a Williams plasticity range of from 50 to 250 millimeters and have recurring structural units of the general formula:

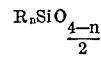

$$R_nSiO_{\frac{4-n}{2}}$$

where $n$ is a number of from about 1.9 to 2.2 and R represents monovalent hydrocarbon radicals, such as alkyl, aryl, aralkyl, alkaryl, alkenyl, halogenated and cyano-substituted aryl radicals. It is also desirable that in the curable organopolysiloxanes the majority of the R radicals be lower alkyl radicals, for example, methyl radicals. It is usually preferred that the organopolysiloxanes from which the curable compositions are prepared contain an average of from about 1.98 to about 2.2 organic groups, for instance, methyl groups or methyl phenyl groups, etc., per silicon atom and that more than 98 percent of the silicon atoms of the polysiloxane contain two silicon bonded organic groups, for instance, alkyl groups or a mixture of alkyl and aryl groups, etc., per silicon atom. Included specifically in this formula are the dimethylpolysiloxanes, methylphenylpolysiloxanes, methylvinylpolysiloxanes, and copolymers of such units, such as copolymers containing dimethyl- and phenylmethylsiloxane units and copolymers containing phenylmethyl-, dimethyl- and vinylmethylsiloxane units.

Various anti-structuring agents may be incorporated in the compositions of this invention to prevent hardening or "crepe aging" of the materials prior to vulcanization. Examples of suitable anti-structuring agents are water; hydroxyl-terminated silanes and siloxanes having a viscosity of from about 30 to 100 centistokes, such as diphenylsilane diols, methylphenylsilane diols, hydroxylated methylpolysiloxanes, hydroxylated methylphenylpolysiloxanes, hydroxylated diphenylpolysiloxanes, methyl endblocked dimethylpolysiloxane fluids; phosphate fluids, such as tripropylphosphate and tributylphosphate; glycols, such as methylene glycol and propylene glycol; esters; and anhydrides, such as phthalic anhydride.

The amount of anti-structuring agents employed in these compositions generally ranges from about 2 to 30 percent, preferably from about 5 to 20 percent, by weight based on the weight of the organopolysiloxane polymers.

Fumed titanium dioxide, for example, that sold by DeGussa Inc., is particularly suitable for imparting heat resistance and improving compression set to cured silicone elastomers. The titanium dioxide is a micro fine product formed of particles of the order of from 15 to 40 millimicrons in size and have a surface area of $50\pm10$ m.² per gram. It has a loose bulk density of from 60 to 70 grams per liter and a shaken bulk density of from 80 to 100 grams per liter.

The amount of titanium dioxide necessary for imparting desirable properties to the cured silicone elastomers may be varied within wide limits. On a weight basis, amounts as low as 3 percent of titanium dioxide based on the organopolysiloxane polymers will be found to exert an improvement in these properties. Generally, amounts ranging from about 3 to 10 percent, more preferably from about 3 to 5 percent, by weight based on the weight of the organopolysiloxane polymers are sufficient for imparting these desirable properties.

Other finely divided fillers, such as reinforcing and non-reinforcing fillers may be incorporated in the curable organopolysiloxane compositions. The amount of fillers used in combination with the organopolysiloxane polymers may be varied within wide limits, for instance, from about 10 to 300 percent by weight of fillers based on the weight of the organopolysiloxane polymers. The exact amount of fillers used will depend upon such factors as, for instance, the application for which the curable organopolysiloxane compositions are intended, the type of fillers employed, e.g., the density of the fillers, the type of curable organopolysiloxanes employed, etc. Obviously, mixtures of reinforcing fillers with non-reinforcing fillers may be employed.

Examples of suitable fillers which may be used are asbestos, clay, hydrated calcium silicate, zinc sulfide, silica aerogel, barium titanate, glass fiber, floc, iron oxide, bentonite, zinc oxide, nickelous oxide, magnesium oxide, micronized graphite, micronized slate, micronized mica, celite, lead dioxide, lead oxide, blue lead, alumina, either hydrated or dehydrated, and calcium carbonate.

Various curing agents may be added to the organopolysiloxane compositions to effect rapid conversion of the compositions to an elastomeric state. Among such curing agents may be mentioned, for example, benzoyl peroxide, t-butyl perbenzoate, bis(2,4-dichlorobenzoyl) peroxide, dicumyl peroxide, dialkyl peroxides, such as di-t-butyl peroxide, etc. These curing agents may be present in amounts ranging from about 0.1 to as high as 4 to 8 percent by weight or even more based on the weight of the organopolysiloxane polymers.

The manner in which the present invention may be practiced may be widely varied. Although the fumed titanium dioxide may be incorporated in the curable organopolysiloxane polymers before the addition of the reinforcing fillers, it may be incorporated simultaneously with the other fillers. Preferably, however, the titanium dioxide is added to the organopolysiloxane polymers prior to milling. Curing agents and other additives, such as dyes, pigments, and flame retardants, may be added to the organopolysiloxane compositions during the milling operation.

Alternatively, the titanium dioxide may be added to the organopolysiloxane compositions and then milled with the reinforcing and non-reinforcing fillers at some future time.

When the organopolysiloxane compositions are molded, they are heated to temperatures of from 100° to 200° C. for varying periods of time, for instance, from about 5 to 30 minutes or more. Molding pressures ranging from about 10 to 1,000 p.s.i. or more are advantageously used. The molded product is preferably given a post-cure treatment at elevated temperatures, for example, from about 1 to 24 hours or more and at temperatures of from 150° to 250° C. to bring out the optimum properties of the cured silicone elastomers.

The silicone elastomers of this invention containing at least 3 percent and preferably not more than 5 percent of fumed titanium dioxide based on the weight of the organopolysiloxane polymers exhibit improved heat stability and improved compression set over conventional silicone elastomers and/or silicone elastomers filled with pigment grade titanium dioxide.

The silicone elastomers of this invention are capable of withstanding elevated temperatures of from 150° to over 300° C. for extended periods of time and retain their desirable properties. Such a range of properties makes them highly useful as insulating materials for electrical conductors and for the production of commercial items such as tubing, hoses, sheeting, gaskets and the like.

The embodiments of this invention are further illustrated by the following examples in which all parts are by weight unless otherwise specified.

EXAMPLE 1

A polysiloxane gum is prepared by co-reacting octamethylcyclotetrasiloxane and tetramethyltetravinylcyclotetrasiloxane in such proportions that the vinylpolysiloxane gum contains about 0.2 mole percent vinyl groups on the polysiloxane chain with 0.001 percent by weight potassium hydroxide at a temperature of about 140° to 150° C. for from 4 to 5 hours. The polysiloxane gum contains an average of about 2.0 methyl groups per silicon atom.

EXAMPLE 2

The organopolysiloxane gum prepared in accordance with the procedure described in Example 1 is utilized in the three formulations shown in Table I.

TABLE I

| Ingredients | Formulations, parts | | |
|---|---|---|---|
| | A | B | C |
| Polysiloxane gum (Example 1) | 100.0 | 100.0 | 100.0 |
| OH-terminated polydimethylsiloxane (50 cs.) | 18.0 | 18.0 | 18.0 |
| Fumed silica (Cab-O-Sil) | 25.0 | 25.0 | 25.0 |
| Titanium dioxide (fumed) | 3.0 | | |
| Titanium dioxide (pigment grade) | | 3.0 | |
| Bis(2,4-dichlorobenzoyl) peroxide | 1.1 | 1.1 | 1.1 |

Each of the formulations shown in Table I is molded and press-cured for 5 minutes at 115° C. at a pressure of 600 p.s.i. and thereafter removed and post-cured for about 16 hours at 232° C. in an air circulating oven. The physical properties of the formulations are illustrated in Table II.

TABLE II

| Physical properties | Formulations | | |
|---|---|---|---|
| | A | B | C |
| Tensile strength, p.s.i. | 650 | 650 | 700 |
| Elongation, percent | 350 | 475 | 475 |
| Hardness, Shore A | 42 | 38 | 38 |
| Compression set, 22/350 | 15 | 30 | 29 |

The above table illustrates the improved compression set of silicone elastomers containing titanium dioxide in comparison with those compositions which either contain or do not contain conventional pigment grade titanium dioxide.

Each of the formulations shown in Table II is heat-aged for about 24 hours at 315° C. in an air circulating oven, at the end of which time the physical properties of the formulations are determined. Table III shows the physical properties of these three formulations after heat-aging.

TABLE III

| Physical properties | Formulations | | |
|---|---|---|---|
| | A | B | C |
| Tensile strength, p.s.i. | 320 | Brittle | Disintegrates. |
| Elongation, percent | 120 | do | Do. |
| Hardness, Shore A | 47 | do | Do. |

The above Table III shows that silicon elastomers which contain fumed titanium dioxide are more stable at temperatures in excess of 300° C. for extended periods of time in comparison with those compositions which either contain or do not contain conventional pigment grade titanium dioxide.

EXAMPLE 3

In this example, formulations are prepared composed of 100 parts of the organopolysiloxane gum described in Example 1, 18 parts of a hydroxyl-terminated polydimethylsiloxane (50 cs.), 25 parts of fumed silica (Cab-O-Sil), and 1.1 part of bis(2,4-dichlorobenzoyl) peroxide. Various amounts of fumed titanium dioxide are added to these basic formulations.

These formulations are press-cured for 5 minutes at 115° C. at a pressure of 600 p.s.i., post-cured for about 16 hours at 232° C. in an air circulating oven, and thereafter heat-aged for 24 hours at 315° C. in an air circulating oven. The physical properties of the post-cured and heat-aged silicone elastomers are illustrated in Table IV.

TABLE IV

| Formulations | TiO₂ (fumed), parts | Tensile strength, p.s.i. | | Elongation, percent | | Hardness, Shore A | |
|---|---|---|---|---|---|---|---|
| | | 16 hr./ 232° C. | 24 hr./ 315° C. | 16 hr./ 232° C. | 24 hr./ 315° C. | 16 hr./ 232° C. | 24 hr./ 315° C. |
| A | 1.0 | 680 | (¹) | 400 | (¹) | 30 | (¹) |
| B | 2.0 | 670 | (¹) | 370 | (¹) | 35 | (¹) |
| C | 3.0 | 650 | 320 | 350 | 120 | 42 | 47 |
| D | 5.0 | 675 | 300 | 375 | 100 | 45 | 52 |

¹ Disintegrated.

The above table IV shows that at least 3 percent by weight of fumed titanium dioxide is essential in order to provide for heat stability and that amounts above 5 percent by weight do not appreciably influence the physical properties of the silicone elastomers.

When other organopolysiloxane polymers containing from 0.01 to 0.35 mole percent vinyl groups are substituted for the methylvinylpolysiloxane gum in these examples, similar results are obtained. Also, when the above examples are repeated utilizing other anti-structuring agents with the fumed titanium dioxide, silicon rubbers are obtained which have excellent heat stability for extended periods of time and have improved compression set.

Although specific examples of the invention have been described herein, it is not intended to limit the invention solely thereto, but to include all the variations and modifications falling within the spirit and scope of the appended claims.

What is claimed is:
1. A heat curable organopolysiloxane composition composed of an organopolysiloxane polymer, an organic peroxide curing agent, and at least 3 and up to about 10 percent by weight based on the weight of the organopolysiloxane polymer of fumed titanium dioxide.
2. The composition of claim 1 wherein the composition contains from 3 to 5 percent by weight of fumed titanium dioxide.
3. The composition of claim 1 wherein the organopolysiloxane polymer has from 1.9 to 2.2 organic radicals per silicon atom.
4. The composition of claim 1 which includes an anti-structuring agent selected from the group consisting of water, hydroxyl-terminated silanes and siloxanes, methyl endblocked polysiloxane fluids, phosphate fluids, glycols, esters and anhydrides thereof in an amount of from about 2 to 30 percent by weight based on the weight of the organopolysiloxane polymer.
5. The composition of claim 1 wherein the organopolysiloxane polymer contains from 0.1 to 0.35 mole percent vinyl groups per silicon atom.
6. The heat cured organopolysiloxane elastomer of claim 1 which has been vulcanized with an organic peroxide curing agent, said organopolysiloxane elastomer being composed of an organopolysiloxane polymer and at least 3 and up to about 10 percent by weight based on the weight of the organopolysiloxane polymer of fumed titanium dioxide.
7. The elastomer of claim 6 wherein the organopolysiloxane polymer is a methylvinylsiloxane containing from 0.01 to 0.35 mole percent vinyl groups.

References Cited
UNITED STATES PATENTS 2,333,948  11/1943  Muskat _____ 106—296
3,464,945  9/1969  Martellock _____ 260—37 Si MORRIS LIEBMAN, Primary Examiner S. M. PERSON, Assistant Examiner U.S. Cl. X.R.

106—300